United States Patent [19]
Salsburg et al.

[11] 3,822,795
[45] July 9, 1974

[54] LOAD SQUARING DEVICE FOR PALLETS

[75] Inventors: Frederic S. Salsburg, Victor; Weston R. Loomer, Canandaigua, both of N.Y.

[73] Assignee: Hartman Metal Fabricators, Inc., Victor, N.Y.

[22] Filed: Dec. 8, 1972

[21] Appl. No.: 313,607

[52] U.S. Cl. .............. 214/6 S, 198/29, 198/33 R, 271/89
[51] Int. Cl. .......................................... B65g 57/00
[58] Field of Search ....... 198/29, 35, 33 R; 214/6 S; 271/89

[56] References Cited
UNITED STATES PATENTS
2,857,058  10/1958  Campbell............................. 198/29
3,737,051  6/1973  Horino................................ 271/89

Primary Examiner—Richard A. Schacher
Assistant Examiner—Richard K. Thomson
Attorney, Agent, or Firm—Shlesinger, Fitzsimmons & Shlesinger

[57] ABSTRACT

Four panels are mounted at the front and back and at the two sides, respectively, of a carriage which is reciprocable vertically above a conveyor. When a loaded pallet has been brought beneath the carriage, the carriage descends; as it descends, curved, stationary cams mounted adjacent the conveyor engage rollers on the lower edges of the panels to urge the panels inwardly to engage and square the load on the pallet. The carriage then rises to inoperative position, retracting the panels.

14 Claims, 5 Drawing Figures

LOAD SQUARING DEVICE FOR PALLETS

This invention relates to automatic warehousing equipment, and more particularly to a device for squaring the load on a pallet travelling on a conveyor in a warehousing system.

For proper movement through the aisles of an automatic warehousing system, it is essential that the load on a pallet be properly squared to prevent the load from projecting beyond the edge of the pallet and being struck and damaged as the stacker carrying the pallet travels down an aisle between storage racks. While it is possible to adjust the load manually on the pallet to prevent possible damage, this is costly and time-consuming, and overall is inefficient and unreliable.

It is an object of this invention to provide a novel squaring device for employment in conjunction with an automatic conveyor automatically to square the load on each pallet that travels on the conveyor before the pallet enters an aisle of the storage apparatus.

Another object of this invention is to provide a device of the type described which is capable of performing a load squaring operation faster and with more reliability than was heretofore possible.

Other objects of the invention will be apparent hereinafter from the specification and from the recital of the appended claims, particularly when read in conjunction with the accompanying drawings.

Figure 1:
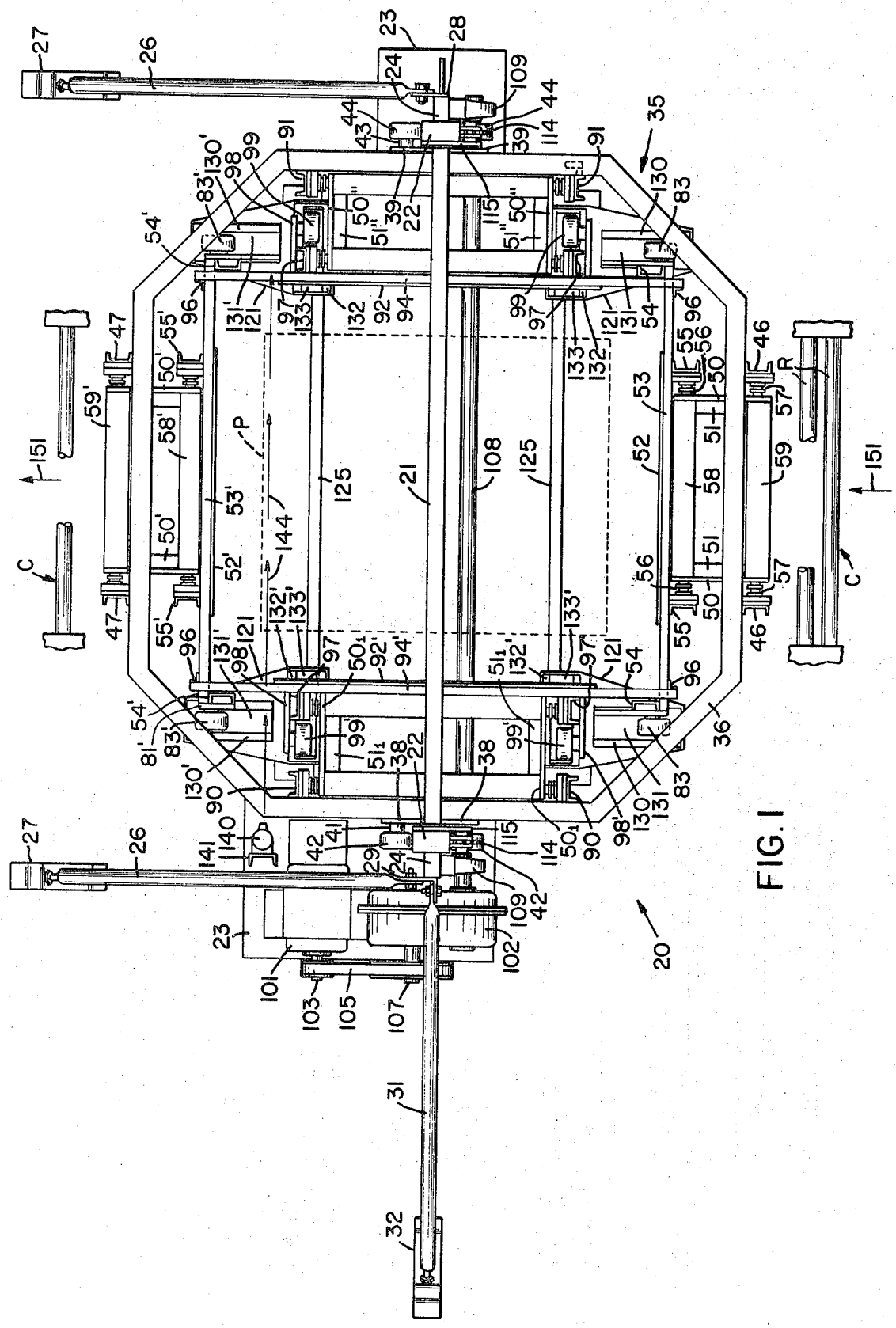
FIG. 1 is a plan view of a squaring device made according to one embodiment of this invention, and illustrating fragmentarily part of a conveyor over which the device is adapted to be mounted.

Referring now to the drawings by numerals of reference, 20 (FIGS. 1 to 3) denotes generally a pallet squaring device comprising two spaced, vertically-disposed posts 22, which are connected at their upper ends by transverse beam 21, and which are fastened at their lower ends on anchor plates 23 that are fixed to the floor F of a warehouse at opposite sides of a conveyor C. Posts 22 and the reinforcing bars 24 that extend along the outer sides thereof, are supported by inclined, tubular braces or struts 26 (FIG. 3) which are fastened at their upper ends by plates 28 and 29 to bars 24, and at their lower ends to anchor plates 27 that are secured to the floor F at opposite sides of the conveyor C. A brace 31 (FIG. 2) holds the apparatus against lateral movement. It is fastened at its upper end to plate 29 and at its lower end to an anchor plate 32 disposed at one side of the apparatus.

Mounted for vertical reciprocation on posts 22 is a load squaring carriage 35, comprising a pair of octagonally-shaped frames 36 and 37 that are secured in vertically spaced, registering relation by vertically disposed side plates 38 and 39, which are fastened to opposite sides of the frames. Mounted to rotate on vertically-spaced pairs of parallel stub shafts 41 (FIG. 3), which project laterally from plate 38, are two pairs of vertically spaced rollers 42, which have rolling contact with opposite sides of one of the posts 22. Similar rollers 44 carried by stub shafts 43 project laterally from the other side plate 39 and roll on the other post 22. Rollers 42 and 44 guide the carriage 35 for vertical movement on posts 22.

Secured to frames 36 and 37 at the front and rear, respectively, of the apparatus are spaced, parallel, vertically disposed channel irons 46 and 47, respectively, (FIG. 1) which extend at their lower ends beneath frame 37.

Mounted within the frames 36, 37 are front and rear squaring plates 52, 52', respectively. Secured to the back of plate 52 (the right hand side in FIG. 3) are a plurality of vertically-spaced, tubular reinforcing members 53, which are rectangular in cross section and which project for equal distances laterally (FIG. 1) beyond opposite side edges of plate 52. The laterally-projecting portions of the reinforcing members 53 are fastened at their fronts to two spaced, parallel, vertically-disposed channel irons 54 (FIG. 1). A further pair of spaced, vertically-disposed channel irons 55 are secured to the backs of reinforcing members 53 intermediate the ends thereof. Adjacent their upper ends the channel irons 55 are pivotally connected by pins 56 to the lower ends of the two rigid links 50. The upper ends of the rigid links 50 are pivotally connected by pins 57 to the upper ends of the channel irons 46. The two links 50 are secured in spaced, parallel relation by transverse rods 58 and 59 which connect the links together at the lower and upper ends respectively, of the links.

Two telescopic links 51 are pivotally connected at their upper ends to the lower ends of channels 46 by pins 61 (FIGS. 3 to 5); and at their lower ends these links are pivotally connected by studs 62 to the lower ends of the channel irons 55.

Figure 5:
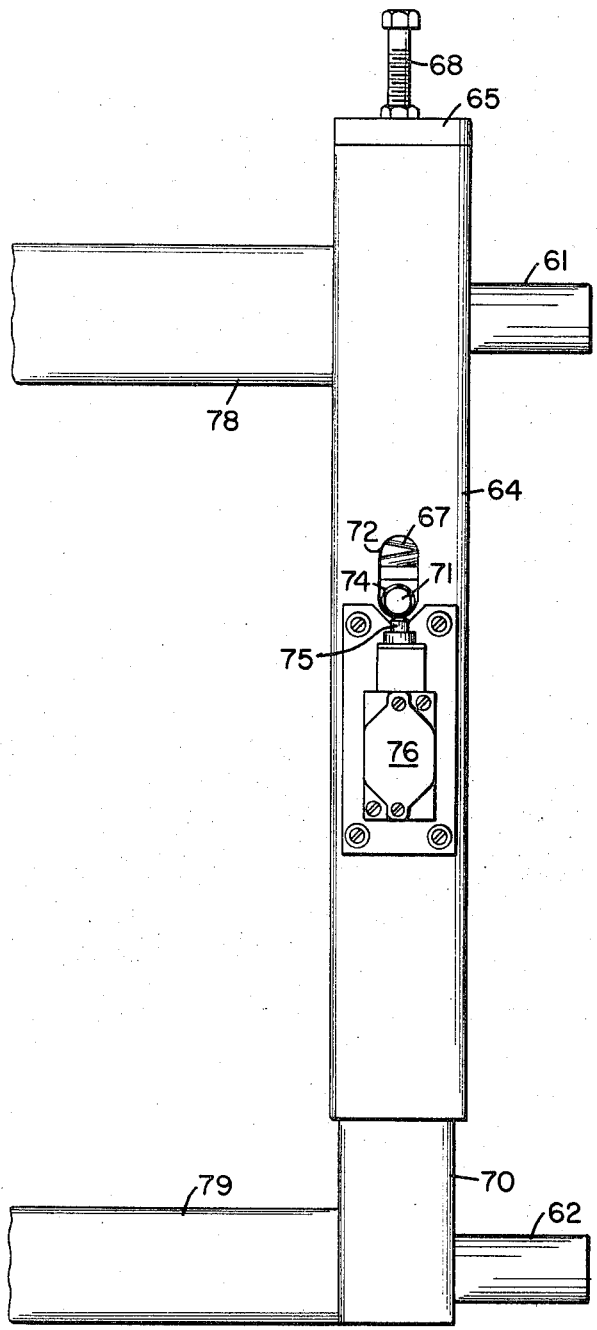
FIG. 5 is a fragmentary elevational view of this link looking at the left side of FIG. 4.
Figure 4:
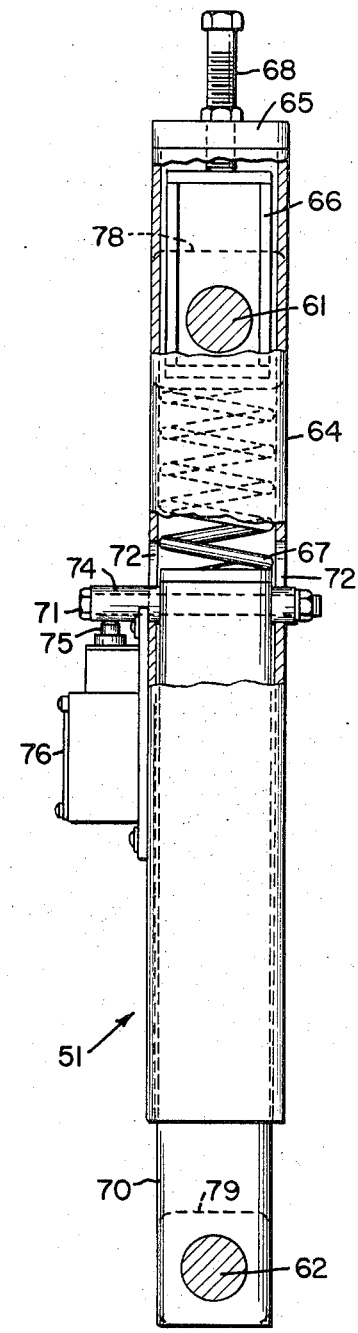
FIG. 4 is an enlarged, fragmentary sectional view taken along the line 4—4 in FIG. 2 looking in the direction of the arrows, portions of the link shown being broken away for purposes of illustration.

As shown more clearly in FIGS. 4 and 5, each link 51 comprises a hollow, rectangular sleeve 64, which is closed at its upper end by a plate 65. Each sleeve 64 contains a hollow, axially slidable block 66, and a compression spring 67 that urges the associated block 66 upwardly against the inner end of a screw 68, which is threaded into the closed end plate 65 of each sleeve. The lower end of each link 51 comprises a hollow, rectangular sleeve 70, which is telescopically slidable in the lower end of the associated sleeve 64 so that its inner end engages the lower end of the associated compression spring 67. A bolt 71, which is secured to the upper end of each sleeve 70, projects at opposite ends through registering, longitudinally extending slots 72, that are formed in opposite sides of surrounding sleeve 64. Mounted on the projecting outer end of each bolt 71 for reciprocation in one of the slots 72 is a sleeve 74. When the carriage 35 is in its upper or inoperative position (FIG. 2), the compression spring 67 in each link 51 urges the telescopic portion 70 downwardly to move the sleeve 74 thereon into engagement with the operating pin 75 of a switch 76 that is fastened on the outside of each sleeve 64.

To maintain the two links 51 in spaced, parallel relation, bars 78 and 79 (FIGS. 4 and 5) are fastened, respectively, between the upper ends of the two sleeves 64, and the lower ends of the two sleeves 70.

Thus the front squaring panel, comprising the plate 52, reinforcing members 53, channel irons 54 and 55 is suspended pivotally from the channel irons 46 and the frames 36 and 37 by the pair of rigid links 50 and the pair of telescopic links 51.

The rear squaring plate 52' is suspended from the frames 36 and 37 in a manner similar to the front plate 52. Plate 52' is backed up by vertically-spaced tubular reinforcing members 53', exactly like those which back up the plate 52'; and the portions of these reinforcing members 53', which project laterally beyond the two sides of the plate 52', are welded or otherwise secured to two vertical, parallel, spaced channel irons 54', similar to channel irons 54, and to two channel irons 55' similar to the channel irons 55. Rigid links 50', similar to links 50, which are pivotally connected at their lower ends to channel irons 55' and at their upper ends to channel irons 47, and telescopic links 51' (FIG. 3), similar to links 51, which are pivotally connected at their upper ends to the channel irons 47 and at their lower ends to channel irons 55', support the panel comprising plate 52', reinforcing members 53', channel members 54' and 55' from frames 36 and 37.

Rollers 83 and 83' are mounted on plates 84 and 84' at the lower ends of the channels 54, 54'. The rollers of each pair 83 and 83' rotate about a common axis that extends parallel to the axes of the rollers R defining the conveyor C.

Fastened to one side of the two frame members 36 and 37 and spaced approximately 90° (FIG. 1) around these frames from the channel irons 46 and 47 are two, spaced, vertical channel irons 90. Mounted on the frames opposite the channel irons 90 are two channel irons 91.

Pivotally supported from the channel irons 91 by a pair of rigid links 50", and a pair of telescopic links 51", like the links 50 and 51 previously described, is a side load-squaring panel comprising the squaring plate 92, reinforcing members 94, similar to reinforcing members 53 and 53', and the channel irons 97, like channel irons 55, 55'. Similarly, a plate 92' is supported by reinforcing bars 94', a pair of rigid links $50_1$, and a pair of telescopic links $51_1$ from the channel irons 90 in spaced, parallel, confronting relation to the plate 92.

At the corners of carriage 35, where the reinforcing bars 94, 94' project beyond the internested, reinforcing bars 53, 53', they are secured to four vertically disposed angle irons 96 (FIG. 1), which are slidable relative to the bars 53, 53'. Although they do not interfere with the movement of bars 53, 53' inwardly from the positions shown in FIG. 1, angle irons 96 do prevent bars 53, 53' from being moved outwardly beyond the positions shown in this figure.

Secured to the backs of the bars 94' behind plate 92' are two, spaced, vertically disposed channel irons 97' which, similarly to the previously described squaring plate supports, are pivotally connected adjacent their upper ends by a pair of rigid links $50_1$ to the upper ends of channel irons 90; and which are pivotally connected adjacent their lower ends by a pair of the telescopic links $51_1$ to the lower ends of channel irons 90. Similarly, bars 94 reinforce plate 92 and these bars are secured to channel irons 97 which are pivotally supported from channel irons 91 and frames 36, 37 by rigid links 50" and telescopic links 51".

Rotatably mounted on plates 98', one of which is fastened to the lower end of each channel iron 97' is a roller 99'. Like rollers 99 are similarly mounted on plates 98 fastened to the lower ends of the channel irons 97.

A pair of coaxially aligned rollers 99, 99' is thus mounted beneath each of the side panels to rotate about an axis that extends at right angles to the axes of rotation of the rollers 83, 83'.

Thus, carriage 35 carries four squaring plates 52, 52', 94, 94' which form the sides of a hollow square. Carriage 35 is driven vertically on posts 22 by an electric motor 101 (FIGS. 1 to 3), which is mounted with a conventional gear reduction unit 102 on the anchor plate 23. The armature 103 of this motor drives the input shaft 107 of unit 102 through pulley 104 (FIG. 3) belt 105, and pulley 106. The output shaft 108 of the reduction unit is journaled intermediate its ends in a pair of pillow blocks 109, which are fastened to the sides of the bars 24.

Figure 2:
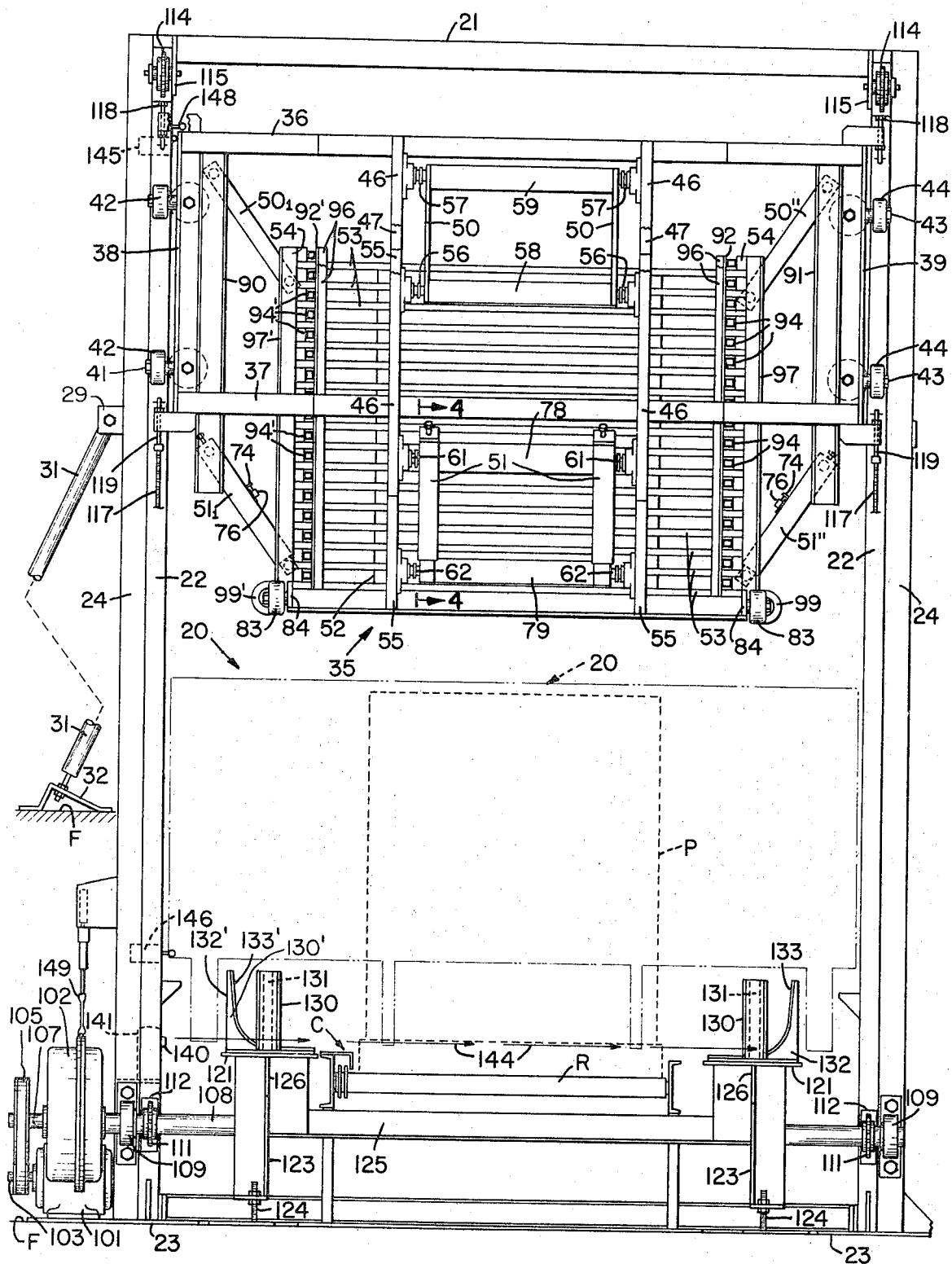
FIG. 2 is a fragmentary front elevational view of this device.
Figure 3:
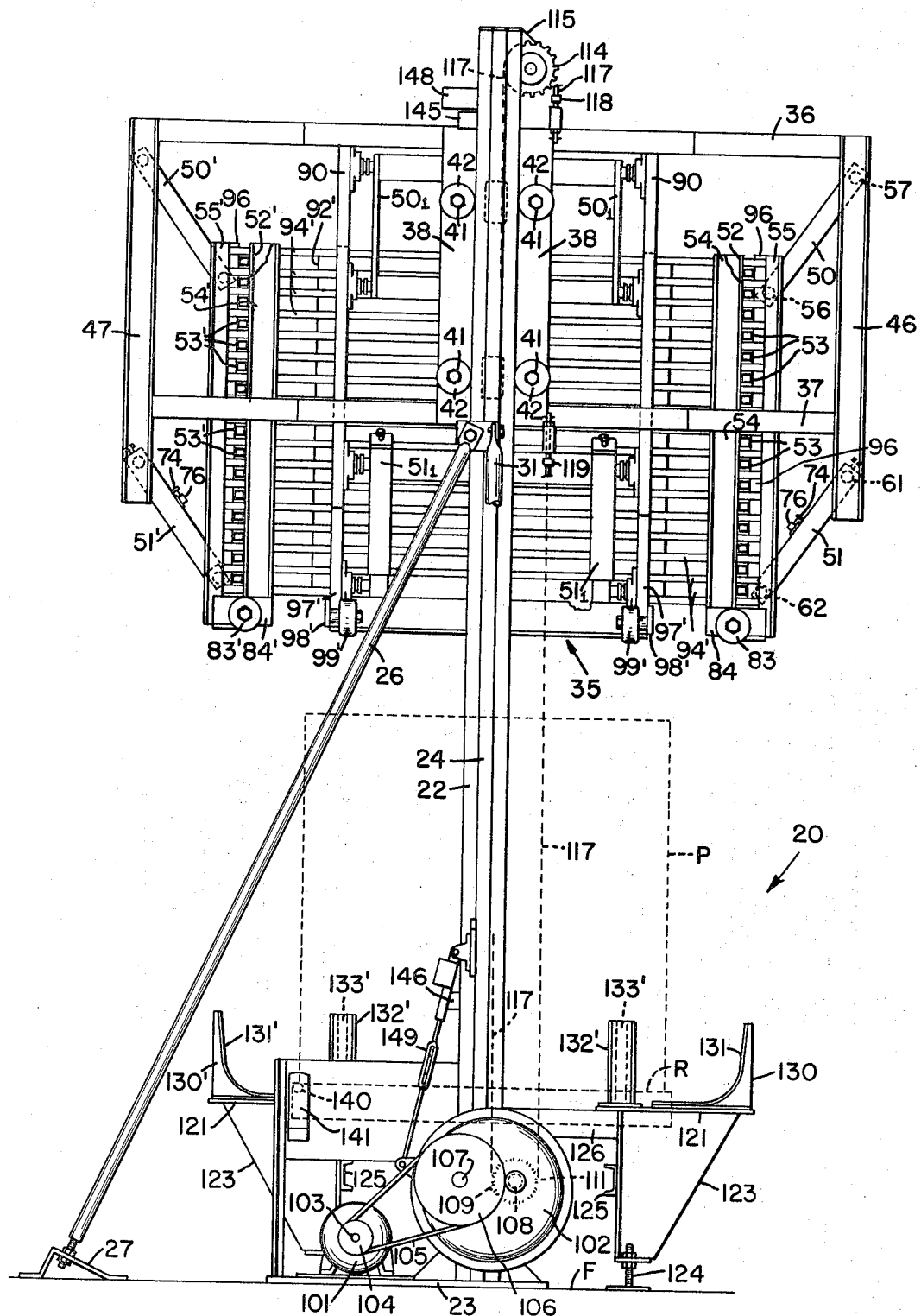
FIG. 3 is a fragmentary side elevational view of this device as viewed from the left side of FIG. 2.

Secured to shaft 108 are two, axially spaced sprocket wheels 111 (FIGS. 2 and 3), portions of which project through openings 112 in the posts 22. Sprocket wheels 114, mounted by gussets 115 on the upper ends of the posts 22, are driven from sprocket wheels 111 by chains 117 (FIGS. 2 and 3). Each gusset 115 is fastened by an anchor bolt 118 to the upper ring frame 36. When the motor 101 drives the shaft 108 in a clockwise direction (FIG. 3) the chains 117 will draw the carriage 35 downwardly from its inoperative to its operative position (broken lines in FIG. 2); and, conversely, when shaft 108 is driven in a counterclockwise direction the carriage 35 will be elevated to inoperative position.

Mounted beneath carriage 35 are four horizontal platform plates 121, that lie in a common plane adjacent the upper surface of conveyor C. Each plate 121 is supported by a bracket 123 (FIGS. 2 and 3), which has limited vertical adjustment through a vertical anchor bolt 124 that projects upwardly from floor F. These brackets are secured against lateral movement by channel members 125, which extend transversely beneath the conveyor C adjacent the forward and rear ends of the squaring device; and these brackets are also secured at opposite ends of a pair of reinforcing plates 126, which extend parallel to each other along opposite sides of the device to hold brackets 123 against movement in the direction of travel of conveyor C.

Secured on the two plates 121, that are located adjacent the front of the device are two, generally rightangular guides or shoes 130, each of which has in its upper surface a generally concave guide groove 131, which faces the rear of the device. These guide grooves are positioned so that when the squaring device is lowered the two guide rollers 83 mounted adjacent the lower edge of the front squaring panel enters these grooves. Fastened on the upper surfaces of the two platforms 121 at the rear of the device are two similar shoes 130' having curved guiding surfaces 131' which receive the two rollers 83' that are mounted on carriage 35 adjacent the lower edge of the rear squaring panel. Likewise, the two platforms 121 at the right side of the device (FIGS. 1 and 2) have secured thereon similar shoes 132 having curved guiding surfaces 133 which face inwardly of the device, and which register with the two rollers 99 that are mounted on the right hand side of the carriage; and the two shoes 132', which are fixed to the two platforms 121 at the left side of the device are positioned so that their curved guiding surfaces 133' register with two rollers 99' mounted on the left side of carriage 35.

For controlling operation of the device, a reflex-type photoelectric switch 140 (FIGS. 1 to 3) is mounted by a bracket 141 at the left side of the device adjacent its rear end to project a light beam horizontally and transversely across the conveyor C as indicated by arrows 144 in FIGS. 1 and 2. Upper and lower limit switches 145 and 146 (FIG. 2), respectively, are mounted on the left post 22 for operation by the upper and lower frames 36 and 37 as the squares descends or ascends. A safety switch 148 may also be mounted on the upper end of the left post 22 (FIG. 2) to limit upward movement of carriage 35. Slight adjustments in the limit positions of the carriage can be effected by operation of a turnbuckle 149 (FIGS. 2 and 3), which controls a conventional overload release device (not shown).

In use, the apparatus is normally in a "Ready" mode in which the photoelectric switch unit 140 directs a beam of light across the upper surface of the conveyor C in the direction indicated by arrows 144; and carriage 35 is in its upper, inoperative position in which the switch 145 is tripped by frame 36 as shown in FIG. 2. At this time the switches 76 on the telescopic links are held in, for example, open positions by the associated operating pins 74 (FIGS. 4 and 5).

When a loaded pallet P (broken lines in FIGS. 1 to 3) has been moved by conveyor C forward between posts 22 of the device in the direction of arrows 151 (FIG. 1) to the point where the pallet blocks the light beam from the photoelectric unit 140, the unit 140 is operated to stop conveyor C and energize motor 101. Motor 101 then causes shaft 108 to be driven clockwise (FIG. 3) so that the chains 117 lower the carriage simultaneously to engage rollers 83, 83' and 99, 99' with shoes 130, 130', 132 and 132'. As the carriage descends, the upper portions of the curved camming surfaces 131, 131', 133, 133' on the shoes cause the rollers 83, 83' and 99, 99' to be driven inwardly, shifting the front and rear plates 52 and 52' toward each other, and the side plates 92 and 92' toward each other.

As the carriage 35 descends also, the links 50, 50', 50'' 50₁ and 51, 51' 51'', 51₁, supporting these panels swing upwardly at a faster rate, thereby shifting the associated panels more rapidly inwardly toward the pallet load. The converging plates thus engage the load on the pallet and square the load. When the carriage 35 has reached its fully lowered position (broken lines in FIG. 2), the frames 37 strikes limit switch 146, thereby causing reversal of motor 101, and return of carriage 35 to its upper, inoperative position (FIG. 3) where the frame 136 once again trips switch 145 to stop the carriage. The carriage will then remain in its elevated position until the next loaded pallet blocks the light beam from the photocell unit 140.

The switches 76 on the telescopic links 51 can be set to interrupt the drive mechanism in event one or more of the plates 52, 52', 92, 92' should strike an obstruction object during the advance thereof in a squaring operation. In such case the increased pressure developed against the panel by the object will cause the lower end of the panel to be swung outwardly against the associated link 51, 51', 51'', 51₁, causing the link to telescope slightly against the resistance of its associated compression spring 67. This telescopic movement shifts the operating pin 74 away from contact 75 of associated switch 76 opening the circuit to motor 101, thus preventing damage to the associated plate or its mounting structure. The safety switch 148 is connected in circuit with motor 101 to break this circuit in event carriage 35 is shifted too far upwardly.

From the foregoing it will be apparent that the instant invention provides relatively simple and extremely reliable means for squaring loads on conveyor-borne pallets and the like. By inserting the device in a position to square loads that are entering a warehouse to be stored therein, the automatic operation of the warehousing system is improved, and the likelihood of damage to improperly placed loads is minimized. A further advantage is that the curved guiding surfaces on the shoes cause the rectangularly arranged squaring plates 52, 52', 92, 92' to advance gradually and smoothly into engagement with the loads on a pallet thus minimizing shock to the loads. Moreover the curved shoes 130, 130', 132, 132' provide an extremely smooth transition from the vertical movement of the plates to horizontal travel thereof toward a loaded pallet, as the carriage 35 descends. Thus, the device operates very smoothly and quietly. In addition, the telescopic links 51, 51', 51'', 51₁ help take up shock on the loads.

While the invention has been described in connection with a specific embodiment thereof, it will be understood that it is capable of further modification; and this application is intended to cover any embodiment of the invention coming within the disclosure or the limits of the appended claims.

Having thus described my invention, what I claim is:

1. In a warehousing system having a conveyor for conveying loaded pallets from one point to another in the system, a device for squaring loads on the conveyor borne pallets, comprising a frame adjacent said conveyor, a carriage mounted for vertical reciprocation on said frame above said conveyor, a first pair of panels movably mounted on said carriage at the front and back of said carriage, respectively, and a second pair of panels movably mounted on said carriage at the two sides of said carriage, respectively, drive means for reciprocating said carriage between an upper, inoperative position in which the panels thereon are spaced above said conveyor and a pallet thereon and a lower, operative position in which said panels are disposed to surround the pallet, a plurality of links supporting the two panels of each pair on said carriage for limited movement vertically and horizontally relative to said carriage, and cooperating guide means mounted on said frame and said panels, respectively, and operative each time said carriage approaches its operative position to shift the two panels of each pair thereof upwardly and inwardly of the carriage, and toward each other, thereby to engage and square the load on the pallet.

2. A warehousing system as defined in claim 1, wherein said links support said panels in rectangularly spaced relation to one another on said carriage, when the latter is in its inoperative position, said guide means on said frame comprise stationary guide members positioned adjacent opposite sides of said conveyor and having thereon curved camming surfaces, and said guide means on said panels comprise a plurality of rollers mounted on said panels adjacent the lower ends thereof to engage said curved camming surfaces, during downward movement of said carriage, to shift the two panels of each pair toward each other and toward the load on said pallet.

3. A warehousing system as defined in claim 2, wherein said squaring device includes
    means mounting said stationary guide members above said conveyor for engagement with said rollers before the panels reach said conveyor, during descent of said carriage, and
    means for adjusting the last-named means to adjust the positions of said stationary guide members vertically with respect to said conveyor.

4. A warehousing system as defined in claim 1, wherein said guide means comprises
    a first plurality of guide members connected to said panels, and
    a second plurality of guide members fixed on said frame adjacent opposite sides of said conveyor to register with said first plurality of members,
    one of said pluralities of members having thereon curved guiding surfaces slidably engageable with the other of said pluralities of members generally to shift the two panels of each pair toward each other when said carriage is lowered to its operative position.

5. A warehousing system as defined in claim 4, wherein
    said links suspend said panels from said carriage for limited swinging movement about horizontal axes, and
    said second plurality of guide members is operative upon engagement with said first plurality of guide members to force said panels to swing upwardly and inwardly of said carriage about said axes during downward motion of said carriage.

6. A warehousing system as defined in claim 4, wherein
    said links are pivotally connected at one end to said panels and at their opposite ends to said carriage to suspend said panels vertically from said carriage and in rectangularly spaced relation to each other, said first plurality of guide members comprises a plurality of rollers mounted adjacent the lower edges of said panels, and
    said second plurality of guide members have curved surfaces thereon engageable with said rollers to swing the panels of each pair inwardly toward one another about the pivotal axes of said links, when said carriage is moved to its operative position.

7. A warehousing system as defined in claim 6, including resilient means interposed between said panels and at least certain of said links and operative resiliently to urge said panels toward one another during descent of said carriage.

8. A ware-housing system as defined in claim 7, wherein
    each of said certain links comprises a pair of members telescopically connected one to the other, and said resilient means comprises a spring interposed between the two members of each of said certain links resiliently to resist telescopic movement of the last-named members during advance of said panels toward each other.

9. A ware-housing system as defined in claim 8, including switch means mounted on each of said certain links to interrupt said drive means, when tripped, and
    means on each of said certain links for tripping the switch means thereon, when the pair of members defining the last-named link have telescoped one into the other a predetermined distance.

10. A device for squaring loads borne by pallets in a warehousing system of the type having a conveyor for transporting loaded pallets from one point to another in the system, comprising
    a carriage having thereon a plurality of movable, vertically-disposed rectangularly spaced panels,
    means mounting said carriage above said conveyor for vertical movement toward and away from the upper surface of the conveyor,
    drive means for reciprocating said carriage from an inoperative position above a loaded pallet on said conveyor to an operative position in which said panels surround said loaded pallet, and for returning said carriage to its inoperative position,
    means for shifting said panels inwardly toward one another and said loaded pallet from inoperative to operative positions, during descent of said carriage to its operative position, to engage and square the load on said pallet,
    means suspending said panels on said carriage for swinging movement under the force of gravity to their inoperative positions, when said carriage is in its inoperative position, and
    stationary guide means engageable with cooperating guide means on said panels, during descent thereof, thereby to effect the shifting of said panels to their inoperative positions.

11. Apparatus for squaring a load on a pallet in a warehousing system of the type having a conveyor for transporting loaded pallets from one point to another in the system, comprising
    a frame adjacent said conveyor,
    a carriage reciprocable vertically in said frame and normally positioned in an inoperative position above said conveyor,
    a normally inoperative motor for reciprocating said carriage,
    a plurality of squaring members,
    means movably mounting said members on said carriage at the front and rear and the two sides thereof, respectively,
    said front and rear members being movable toward and from one another, and said side members being movable toward and from one another,
    means positioned to be actuated, on movement by said conveyor of a loaded pallet beneath said carriage, to stop said conveyor and to start said motor to effect downward movement of said carriage to lower said squaring members so that they are disposed around the load on the pallet, and
    means operative during said lower movement to move said front and rear members toward one another and to move said side members toward one another, thereby to effect squaring of a load on the pallet,
    said means for effecting movement of said squaring members toward one another comprising stationary cams disposed along side the conveyor and followers connected to said squaring members to engage said cams.

12. Apparatus as claimed in claim 11, wherein said means for stopping said conveyor includes a photoelectric eye.

13. Apparatus as claimed in claim 11 wherein said mounting means includes a pair of rigid links each pivotally connected at one end to a squaring member and pivotally connected at its other end to said frame, and a pair of two-part telescoping link members, one part of each telescoping link member being pivotally connected to said frame and the other part thereof being pivotally connected to a squaring member.

14. Apparatus as claimed in claim 11, having means positioned to be tripped by said carriage when it has descended to a predetermined location to reverse said motor to raise said carriage, and to restart the conveyor.

* * * * *